US010988052B2

(12) United States Patent
Takamatsu et al.

(10) Patent No.: US 10,988,052 B2
(45) Date of Patent: Apr. 27, 2021

(54) SEAT FOR VEHICLE (71) Applicant: Nissan Motor Co., Ltd., Yokohama (JP)

(72) Inventors: Atsushi Takamatsu, Kanagawa (JP);
Shinichirou Nakajima, Kanagawa (JP);
Hiroaki Miura, Kanagawa (JP);
Souichiro Mori, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 15/573,119

(22) PCT Filed: May 12, 2015

(86) PCT No.: PCT/JP2015/063588
§ 371 (c)(1),
(2) Date: Nov. 9, 2017

(87) PCT Pub. No.: WO2016/181487
PCT Pub. Date: Nov. 17, 2016

(65) Prior Publication Data
US 2018/0126876 A1    May 10, 2018

(51) Int. Cl.
*B60N 2/12* (2006.01)
*B60N 2/02* (2006.01)
*B60N 2/16* (2006.01)
*B60N 2/06* (2006.01)
*B60N 2/22* (2006.01)
(Continued)

(52) U.S. Cl.
CPC ............. *B60N 2/12* (2013.01); *B60N 2/0252* (2013.01); *B60N 2/0292* (2013.01); *B60N 2/045* (2013.01); *B60N 2/06* (2013.01); *B60N 2/10* (2013.01); *B60N 2/16* (2013.01); *B60N 2/22* (2013.01); *B60N 2002/0268* (2013.01)

(58) Field of Classification Search
None
See application file for complete search history.

(56) References Cited

U.S. PATENT DOCUMENTS

2002/0121803 A1* 9/2002 Schooler .............. B60N 2/0232
297/330
2010/0259081 A1  10/2010 Kuno
(Continued)

FOREIGN PATENT DOCUMENTS

EP        3000683 A1    3/2016
JP     H07-327768 A    12/1995
(Continued)

*Primary Examiner* — Lail A Kleinman
(74) *Attorney, Agent, or Firm* — Young Basile Hanlon & MacFarlane, P.C.

(57) ABSTRACT

When an occupant stretches his/her lower extremity in a state where putting his/her foot on a foot resting portion during autonomous driving of a vehicle, a seat is controlled so as to move rearward and obliquely upward along a control portion. Concurrently, a seat cushion is controlled so that its front portion moves downward while being supported by a link member and then its inclination angle is made gentle. When at least one of a position and an angle of at least one of the seat cushion and the seatback is controlled, an upper end of the seat is located on an inclined straight line extending downward on a forward side of the upper end.

16 Claims, 10 Drawing Sheets (51) Int. Cl.
*B60N 2/10* (2006.01)
*B60N 2/04* (2006.01)

(56) References Cited

U.S. PATENT DOCUMENTS

| | | | |
|---|---|---|---|
| 2012/0104819 A1* | 5/2012 | Line | B60N 2/163 297/326 |
| 2012/0161486 A1* | 6/2012 | Stojanovic | B60N 2/12 297/354.1 |
| 2016/0082976 A1* | 3/2016 | Sugioka | B60W 50/0098 701/23 |

FOREIGN PATENT DOCUMENTS

| | | | |
|---|---|---|---|
| JP | 2005104456 A | 4/2005 |
| JP | 2005-271770 A | 10/2005 |
| JP | 3892088 B2 | 3/2007 |
| JP | 2008-105508 A | 5/2008 |
| JP | 2009-214793 A | 9/2009 |
| JP | 2010-246599 A | 11/2010 |

* cited by examiner

SEAT FOR VEHICLE

TECHNICAL FIELD

The present invention relates to a seat for a vehicle.

BACKGROUND

In Japanese Granted Patent No. 3892088, disclosed is technology in which, with respect to a seat for a vehicle, concurrently with rearward reclining of a seatback, a rear portion of a seat cushion moves downward while the seat cushion moves forward. According to this, a hip of an occupant sitting on the seat can be prevented from moving forward, and thereby an appropriate seating state can be obtained.

However, with a conventional seat for a vehicle, when moving a seat cushion and a seatback are moved in order to obtain appropriate seating state, a downward viewing angle of an occupant changes, and thereby it is concerned that a view field cannot be ensured sufficiently.

Therefore, the present invention intends to restrict an occupant's downward viewing angle from changing when a seat moves.

SUMMARY

In the present invention, when an occupant sitting on a seat stretches his/her lower extremity, at least one of a position and an angle of at least one of a seatback and a seat cushion is controlled so that an upper end of the seatback is located on an inclined straight line extending downward on a forward side of the upper end.

According to the present invention, when a seat is controlled, an occupant's downward viewing angle is restricted from changing, and thereby a field of view can be ensured sufficiently.

DETAILED DESCRIPTION OF THE EMBODIMENTS

Hereinafter, embodiments for carrying out the present invention will be described in detail with reference to the drawings.

Figure 1:
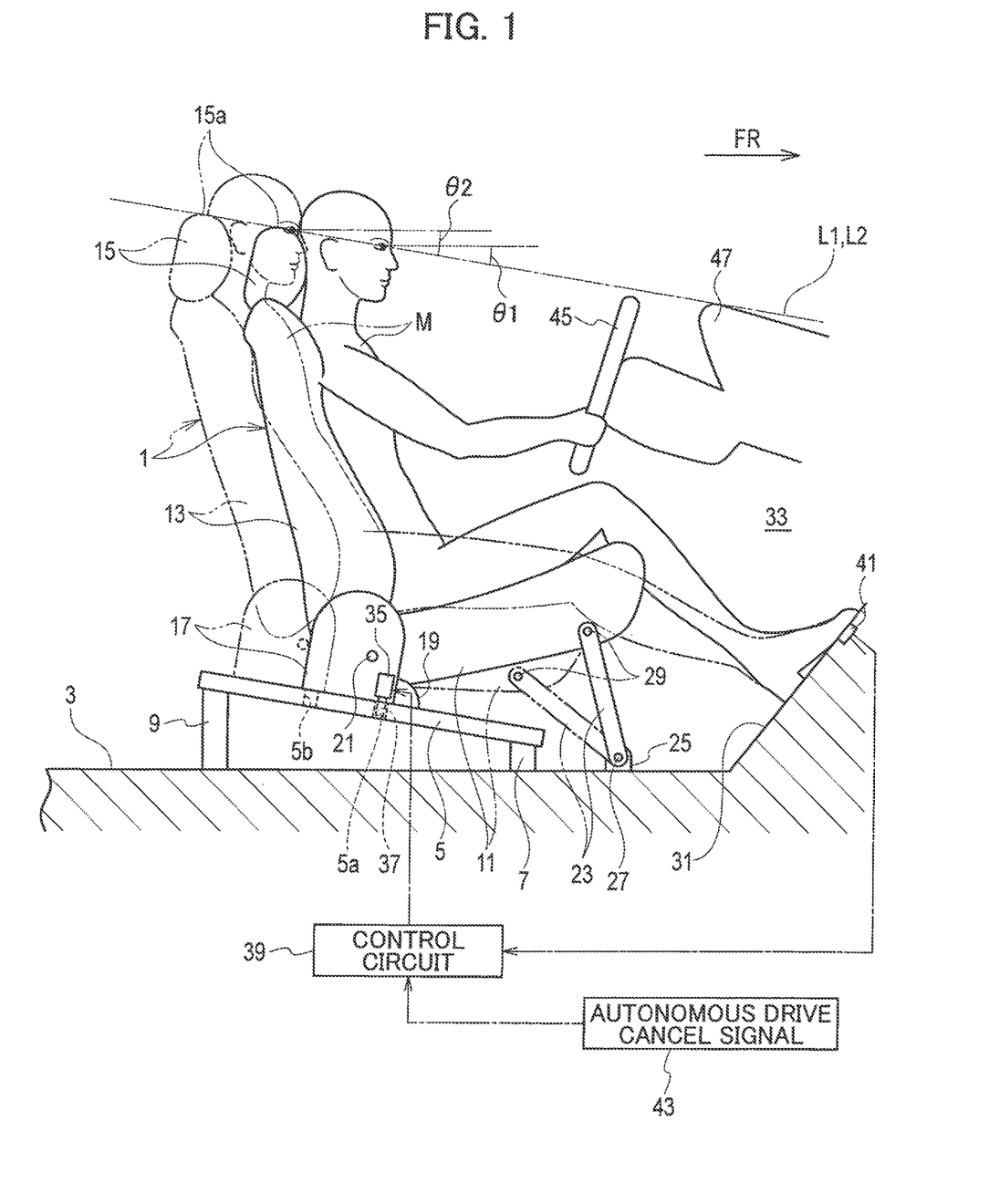
FIG. 1 is a drawing for explaining operations of a seat for a vehicle according to a first embodiment of the present invention.

FIG. 1 shows operations of a seat for a vehicle according to a first embodiment of the present invention. A direction indicated by an arrow FR in the drawing is a front of the vehicle. The vehicle on which the seat 1 is mounted is an autonomous driving vehicle in which acceleration/deceleration and steering are carried out autonomously. The seat 1 includes a seat cushion 11, a seatback 13, and a headrest 15 that is attached to an upper end of the seatback 13.

Figure 2:
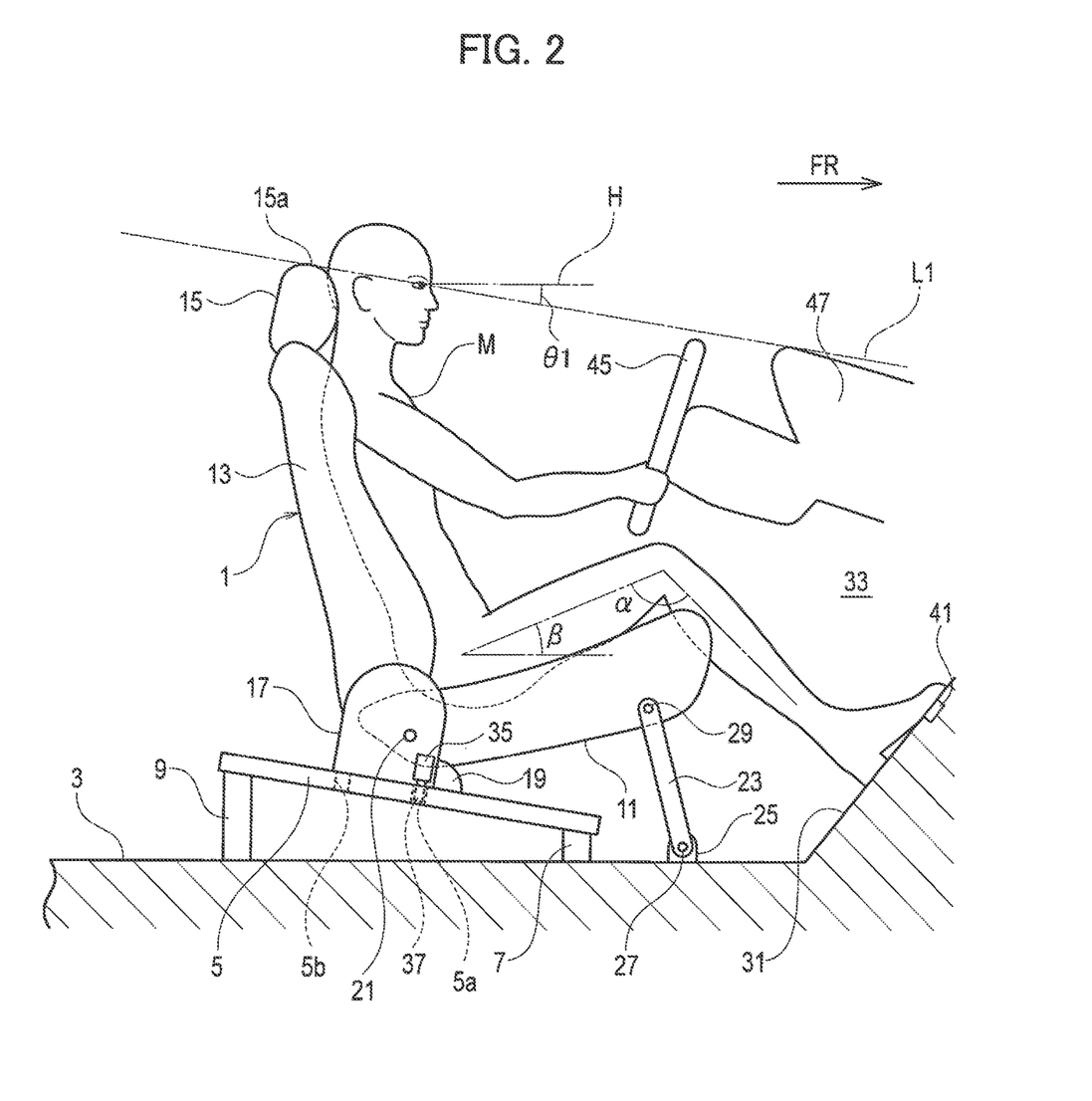
FIG. 2 is a side view showing a state where the seat for the vehicle shown in FIG. 1 is in a driving position.
Figure 3:
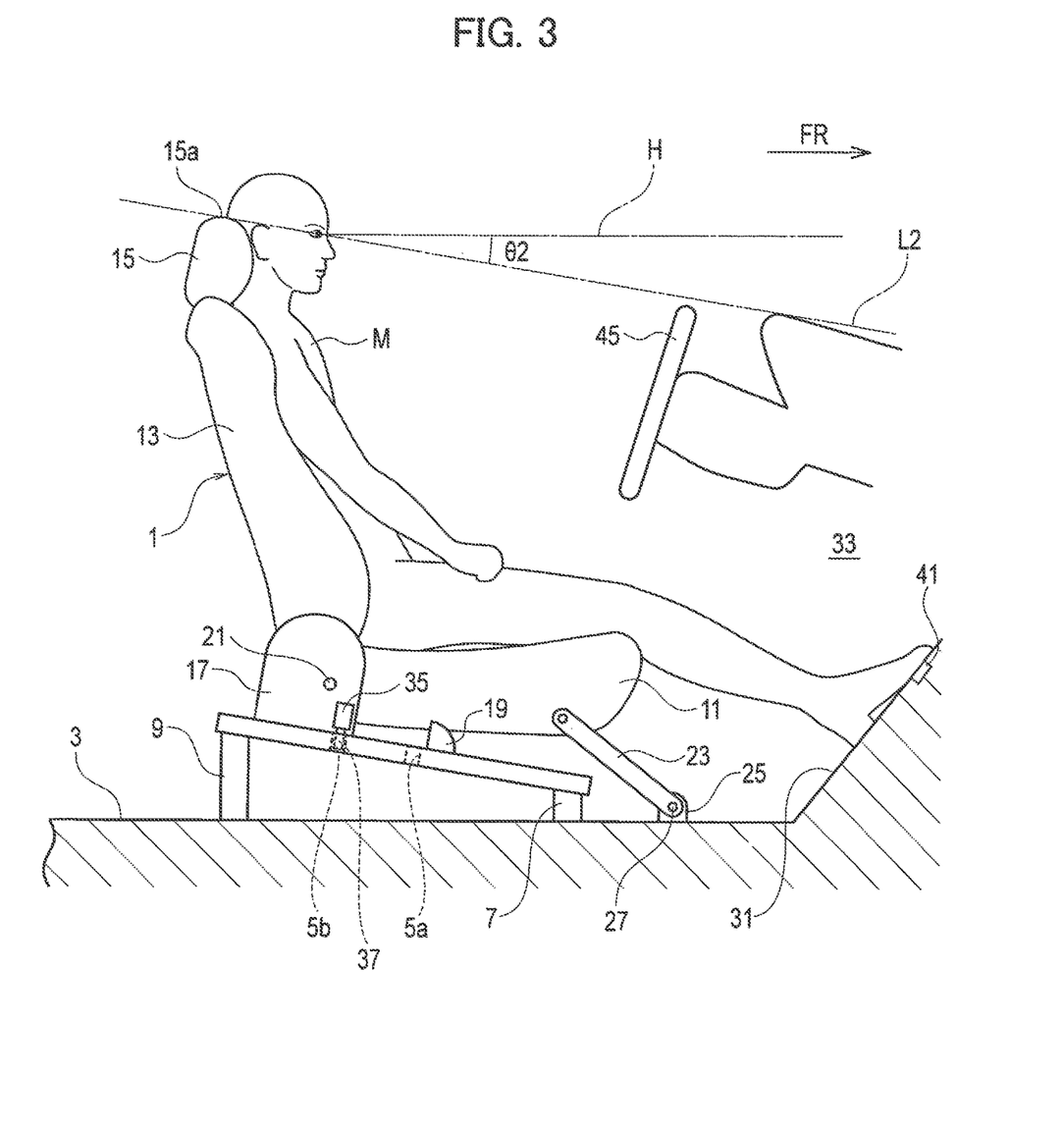
FIG. 3 is a side view showing a state where the seat for the vehicle shown in FIG. 1 is in a relaxing position.

A position of the seat 1 shown by solid lines in FIG. 1 is equivalent to FIG. 2 containing a state where autonomous driving is not carried out. On the other hand, a position of the seat 1 shown by two-dot chain lines in FIG. 1 is equivalent to FIG. 3 showing a state where autonomous driving is carried out. Hereinafter, the position of the seat 1 shown in FIG. 2 is denoted as a driving position, and the position of the seat 1 shown in FIG. 3 is denoted as a relaxing position.

Inclined guide rails 5 are provided on a floor 3 of a vehicle body as an inclined guide portion that controls the seat 1 to side it. The inclined guide rails 5 extend in a vehicle front-rear direction, and are provided in a pair (two pieces) so as to be associated with vicinities of both sides of the seat 1 in a vehicle width direction.

The pair of inclined guide rails 5 is supported by front support members 7 at its vehicularly front side, and is supported by rear support members 9 whose vertical length is longer than that of the front support members 7 at its vehicularly rear side. Therefore, the pair of inclined guide rails 5 inclines in the vehicle front-rear direction so as to its vehicularly rear side is positioned higher in an upper-lower direction than its vehicularly front side. The seat 1 is controlled so as to move along the inclined guide rails 5 in the vehicle front-rear direction.

Lower portions, on both sides in the vehicle width direction, of the seat cushion 11 and the seatback 13 are attached to a pair of slide brackets 17. The pair of slide brackets 17 is provided so as to be associated with the pair of inclined guide rails 5, and slides along the inclined guide rails 5.

Therefore, when the slide brackets 17 move along the inclined guide rails 5, the seat cushion 11 and the seatback 13 move integrally with each other. In the driving position shown in FIG. 2, the slide brackets 17 are restricted from moving forward by a stopper 19 provided on the inclined guide rail 5.

The seatback 13 is fixed with the slide brackets 17 at its lower portion, or its inclination angle in the front-rear direction at its lower portion can be adjusted by a reclining mechanism that is not shown in the drawings. In the driving position shown in FIG. 2, the seat cushion 11 inclines so that its front portion is positioned higher than its rear portion. The rear portion of the seat cushion 11 in an inclined state is rotatably coupled with the slide brackets 17 with a support axis 21 having an axial center along the vehicle width direction interposed therebetween.

The front portion of the seat cushion 11 is supported by the floor 3 with links 23 as a link member interposed therebetween. The links 23 are provided in a pair so as to be associated with vicinities of both sides of the seat 1 in the vehicle width direction, similarly to the pair of the inclined guide rails 5. Each lower portion of the links 23 rotates about a lower pin 27 with respect to a lower bracket 25 provided on the floor 3. Each upper portion of the links 23 rotates about an upper pin 29 with respect to the seat cushion 11.

In the driving position shown in FIG. 2, each of the links 23 inclines so that its upper portion is positioned more vehicularly rearward than its lower portion. Therefore, when an occupant M sits on the seat 1 in the driving position, the seat cushion 11 is supported in the above-mentioned inclined state by the links 23 at its front portion, and by the inclined guide rails 5 at its rear portion with the slide brackets 17 interposed therebetween. Here, a stopper(s) that restricts the links 23 from rotating clockwise in FIG. 2 may be provided in vehicularly front of the links 23 on the floor 3.

The inclined guide rails 5 and the links 23 configures a control portion that controls at least any one of a position and an angle of at least any one of the seatback 13 and the seat cushion 11.

Footrests 31 as a foot resting portion on which the occupant M can put his/her feet are provided on the floor 3 on the vehicularly front side of the seat 1 at a lower portion of a dashpanel that is not shown in the drawings. The dashpanel is a bulkhead member that positions at a front in a passenger compartment 33 to separate it from an engine compartment that accommodates an engine that is not shown in the drawings and so on.

The footrests 31 are provided, respectively, at a vicinity of a side portion of a floor tunnel extending in the vehicle front-rear direction at the center of the floor 3 in the vehicle width direction and at a vicinity of an inner side of the vehicle body in front of a front door that is not shown in the drawings. Namely, the footrests 31 are disposed on both left and right sides with pedals such as an accelerator pedal and a brake pedal that are depressed by the occupant M located therebetween.

A left foot of the occupant M sitting on the seat 1 of a right-side driver's seat is put on the footrest 31 on a side of the floor tunnel that is located on a far side with respect to a plane of FIG. 1. A right foot of the occupant M is put on the footrest 31 on a side of the front door that is located on a near side with respect to the plane of FIG. 1. Since the right foot of the occupant M needs to depress the accelerator pedal or the brake pedal, a case where the right foot is put on the footrest 31 occurs when the vehicle carries out autonomous driving.

In the driving position shown in FIG. 2, when the occupant M stretches his/her lower extremity(-ties) in a state where he/she puts his/her both feet on the footrests 31, the seat 1 is controlled to slide rearward and obliquely upward along the inclined guide rails 5 and thereby turns into the relaxing position shown in FIG. 3. Along with sliding of the seat 1, the upper portion of the links 23 rotates counter-clockwise in FIG. 2 about the lower pin 27 as a pivot point and turns into a state where it is inclined further as shown in FIG. 3.

A drive portion 35 such as an electromagnetic actuator is attached at a lower portion of the slide bracket 17 on a vehicularly front side. The drive portion 35 includes a lock key 37 that strokes towards and is retracted from the inclined guide rail 5, and is driven and controlled by a control circuit 39 shown in FIG. 1. On the other hand, the inclined guide rail 5 includes lock holes 5a and 5b into which the lock key 37 can be inserted, respectively, when the slide brackets 17 are in states shown in FIG. 2 and FIG. 3.

As shown in FIG. 2, when the lock key 37 is inserted into the front-side lock hole 5a, the seat 1 in the state before the occupant M stretches his/her lower extremity is restricted from moving. Therefore, the drive portion 35 including the lock key 37 and the lock hole 5a configure a control restriction mechanism that restricts a control for the seat 1 in the state before the occupant M stretches his/her lower extremity.

As shown in FIG. 3, when the lock key 37 is inserted into the rear-side lock hole 5b, the seat 1 in the state after the occupant M stretches his/her lower extremity is restricted from moving. Therefore, the drive portion 35 including the lock key 37 and the lock hole 5b configure a restitution restriction mechanism that restricts a restitution from a position of the seat 1 in the state after the occupant M stretches his/her lower extremity to a position of the seat 1 in the state before the occupant M stretches his/her lower extremity.

A foot power sensor 41 as a foot power detector that detects a foot power of the occupant M is provided in each of the footrests 31. When the occupant M in the state shown in FIG. 2 is putting his/her foot (feet) on the footrest(s) 31 and then is going to stretch his/her lower extremity in an autonomous driving state of the vehicle, a load is applied to the footrest 31. At that time, the foot power sensor 41 detects a change of a foot power of the occupant M.

When the foot power of the occupant M increases, the foot power sensor 41 detects a foot power with a value equal-to or larger-than a prescribe value that is associated with an action of stretching lower extremity by the occupant M. When the control circuit 39 receives a foot power detection signal with a value equal-to or larger-than the prescribe value, the control circuit 39 drives and controls the drive portion 35 to retract the lock key 37 from the lock hole 5a to unlock them. Therefore, the control circuit 39 includes a control restriction mechanism unlock portion that unlocks the control restriction mechanism when the foot power sensor 41 detects a foot power with a value equal-to or larger-than the prescribed value associated with stretching lower extremity by the occupant M during autonomous driving of the vehicle.

When the occupant M reduces his/her foot power and thereby the foot power sensor 41 detects a foot power with a value lower than the prescribed value in the state shown in FIG. 3 where the vehicle carries out autonomous driving, the control circuit 39 drives and controls the drive portion 35 to retract the lock key 37 from the lock hole 5b to unlock them. In addition, when an autonomous driving state of the vehicle is cancelled, the control circuit 39 receives an autonomous drive cancel signal shown in FIG. 1 and thereby the control circuit 39 drives and controls the drive portion 35 to retract the lock key 37 from the lock hole 5b to unlock them.

Therefore, the control circuit 39 includes a restitution restriction mechanism unlock portion that unlocks the restitution restriction mechanism that restitutes the seat 1 to the state before the occupant M stretches his/her lower extremity by unlocking the restitution restriction mechanism when the autonomous driving state is cancelled during autonomous driving of the vehicle or when the foot power sensor 41 detects a foot power with a value smaller than the prescribed value. The restitution restriction mechanism and the restitution restriction mechanism unlock portion configure a restitution executor.

When inserting the lock key 37 into the lock hole 5a or the lock hole 5b, the control circuit 39 would drive and control the drive portion 35 when a sensor that is provided on the inclined guide rail 5 and is not shown in the drawings detects the slide bracket 17.

Next, operations of the first embodiment will be described.

The state of the seat 1 shown by the solid lines in FIG. 1 and shown in FIG. 2 is the driving position, and the occupant M sitting on the seat 1 manipulates a steering wheel 45 by gripping it with his/her hands and manipulates the accelerator pedal or the brake pedal by depressing it with his/her right foot. His/her left foot is arbitrarily put of the left-side footrest 31.

Transition of the vehicle into an autonomous drive state is made when the occupant M operates a switch for stating autonomous driving that is not shown in the drawings and then duration time of the autonomous drive state becomes long, for example, the occupant M may feel swelling of lower extremity(-ties) and then feel fatigued.

In such a situation, when the occupant M stretches his/her lower extremity(-ties) in the state where his/her foot (feet) is put on the footrest(s) 31 as shown in FIG. 2, a load is applied to the footrest 31 and then the foot power sensor 41 detects a foot power with a value equal-to or larger-than the prescribed value. When the foot power sensor 41 detects the foot power with the value equal-to or larger-than the prescribed value, the control circuit 39 receives the detection signal and then drives and controls the drive portion 35 to retract the lock key 37 from the lock hole 5a to unlock them. Note that the lock key 37 may be retracted from the lock hole 5a to unlock them at a time when the transition of the vehicle into the autonomous driving state is made.

When being unlocked, a reaction force of the load applied to the footrest 31 acts on the seat 1 through a dorsal region and a lumber region of the occupant M. The seat 1 that receives the load applied by the occupant M is controlled to slide rearward and obliquely upward along the inclined guide rails 5 with the slide brackets 17 interposed therebetween, and then turns into the relaxing position shown in FIG. 3.

Along with rearward sliding of the seat 1, the upper portions of the links 23 rotate counterclockwise in FIG. 2 about the lower pin 27 as a pivot point. Due to the rotation, the links 23 turn into a state where they are further close to horizontal as shown in FIG. 3 so that their upper portions are located closer to the inclined guide rails 5 than their lower portions.

Along with this, the seat cushion 11 rotates clockwise in FIG. 2 about the support axis 21 at its rear portion, and then turns into a state where it is further close to horizontal as shown in FIG. 3. At this time, the seat cushion 11 is supported by the inclined guide rails 5 at its rear portion, and by the inclining links 23 at its front portion. Here, a stopper(s) that restricts the links 23 from rotating counterclockwise in FIG. 3 may be provided vehicularly behind the links 23 on the floor 3.

When the occupant M is in the state where his/her lower extremity(-ties) is stretched as shown in FIG. 3, his/her knee angle α increases and his/her thigh angle ß decreases. Muscles of any part in her/his leg(s) stretch by the increase of the knee angle α and then blood flows of the occupant M are remedied by the muscle pumping effect, so that the swelling of his/her lower extremity(-ties) caused by a long-time vehicle riding can be decreased. A contacting state of the thigh of the occupant M with the seat cushion 11 is made more uniform than a state shown in FIG. 2, and thereby stress concentration to his/her buttocks is decreased. Further, muscle stiffening at joints in his/her extremity(-ties) is decreased by being in a state of stretching his/her extremity(-ties), and thereby ranges of joint motion can be ensured by muscle activation. Therefore, fatigue symptoms, such as a feeling of being hard to move his/her joints when getting off a vehicle after a long-time vehicle riding, can be decreased.

As shown in FIG. 2, the occupant M sitting on the seat 1 during normal driving (in the driving position) has, as a view field range in front of the vehicle, a range with a downward viewing angle θ1 to a horizontal line H with respect to a lower side from the horizontal line H in front in a visual direction. An inclined straight line L1 that forms the downward viewing angle θ between itself and the horizontal line H is a straight line that is almost tangent to an upper face of an instrument panel in the passenger compartment 33 or to an upper face of an engine food outside the vehicle. Then, an upper end 15a of the headrest 15 is located on the inclined straight line L1. The upper end 15a of the headrest 15 corresponds to the upper end of the seat 1.

As shown in FIG. 3, the occupant M sitting on the seat 1 during autonomous driving (in the relaxing position) also has, as a view field range in front of the vehicle, a range with a downward viewing angle θ2 to the horizontal line H with respect to the lower side from the horizontal line H in front in the visual direction. The downward viewing angle θ2 is formed between the horizontal line H and an inclined straight line L2. Similarly to the inclined straight line L1, the inclined straight line L2 is a straight line that is almost tangent to the upper face of the instrument panel in the passenger compartment 33 or to the upper face of the engine food outside the vehicle. Also in the state shown in FIG. 3, the upper end 15a of the headrest 15 is located on the inclined straight line L2.

In the present embodiment, [the downward viewing angle θ1]=[the downward viewing angle θ2] is satisfied. Therefore, the inclined straight line L1 and the inclined straight line L2 correspond to each other as shown in FIG. 1 when viewing from a side in the vehicle width direction. Here, the downward viewing angles θ1 and θ2 of the occupant M almost coincide with each other between the driving position shown in FIG. 2 and the relaxing position shown in FIG. 3, and thereby there is only little change between the two.

In the present embodiment, a position and an angle of the seat cushion 11 is controlled so that the upper end 15a of the seat 1 is located on the inclined straight line L1, L2 extending downward on a forward side of the upper end 15a when the occupant M sitting on the seat 1 stretches his/her lower extremity(-ties). The position of the seat cushion 11 is controlled so that it moves vehicularly rearward and upward. The angle of the seat cushion 11 is controlled by rotating its front portion to be lowered about its rear portion as a pivot point.

According to the present embodiment, the downward viewing angle(s) θ1, θ2 of the occupant M can be restricted from changing, even if the lower extremity(-ties) is stretched when the vehicle is in the autonomous driving and the seat 1 is in the driving position shown in FIG. 2 and then the seat 1 turns into the relaxing position shown in FIG. 3. By restricting the downward viewing angle(s) θ1, θ2 from changing and keeping the downward viewing angle(s) θ1, θ2 almost constant, a view field required for driving operations and forward drive-monitoring can be ensured sufficiently.

In the present embodiment, the seat 1 is controlled while being guided by the inclined guide rails 5 that configure the control portion. Therefore, the seat position can be changed, while ensuring the downward viewing angle(s) θ1, θ2 of the occupant M, by a simple mechanism for moving the seat 1 along the inclined guide rails 5.

In the present embodiment, the seat cushion 11 is provided so that its front portion is rotatable in the upper-lower direction about its rear portion as a pivot point, and the front portion of the seat cushion 11 and the floor 3 is linked with each other by the links 23. The links 23 rotatably supports the seat cushion 11 about its side close to the floor 3 as a pivot point so that its front portion is lowered while the seat cushion 11 is controlled rearward by being guided by the inclined guide rails 5.

Therefore, the seat cushion 11 is controlled in a state where its front portion is supported by the links 23 so that its front portion is lowered with its rear portion functioned as a pivot point and its rear portion is slid along the inclined guide rails 5, and thereby it can turn into the relaxing position.

The present embodiment includes the control circuit 39 that unlock engagement of the lock key 37 and the lock hole 5a when the foot power sensor 41 detects a foot power with a value equal-to or larger-than the prescribed value associated with stretching of the lower extremity by the occupant M during autonomous driving of the vehicle. Therefore, the lock key 37 is disengaged when the occupant M depresses the footrest 31 in a state where the seat 1 is in the driving position shown in FIG. 2 during autonomous driving of the vehicle, and thereby the relaxing position shown in FIG. 3 can be obtained arbitrarily.

Note that the lock key 37 and the lock hole 5a may not be provided. In this case, the rearward control of the seat 1 can be done by a simpler mechanism. On the other hand, by providing the lock key 37 and the lock hole 5a, the seat 1 in the driving position shown in FIG. 2 can be held more surely.

The present embodiment includes the control circuit 39 that restitutes the seat 1 to the state before the occupant M stretches his/her lower extremity by unlocking the lock key 37 and the lock hole 5b when the autonomous driving state is cancelled during autonomous driving of the vehicle or when the foot power sensor 41 detects a foot power with a value smaller than the prescribed value.

Therefore, the seat 1 is immediately controlled forward along the inclined guide rails 5 and turns into the driving position shown in FIG. 2 when the autonomous driving is cancelled in the relaxing position shown in FIG. 3 or when the foot power sensor 41 detects a foot power with a value smaller than the prescribed value. Therefore, the occupant M can immediately transition to manipulations of operating components such as the steering wheel 45 according to his/her intention. The controlled forward movement of the seat 1 is done by its own weight of the seat 1.

When the seat 1 moved forward, the upper portions of the links 23 rotate clockwise in FIG. 3 about the lower pin 27 as a pivot point and then they turns into a state where they are further close to vertical as shown in FIG. 2. Here, the seat cushion 11 rotates counterclockwise in FIG. 3 about the support axis 21 at its rear side, and then turns into a state where it is inclined so as to make its front portion higher as shown in FIG. 2.

Note that the lock key 37 and the lock hole 5b may not be provided. In this case, the forward control of the seat 1 can be done arbitrarily by a simpler mechanism. On the other hand, by providing the lock key 37 and the lock hole 5b, the seat 1 in the relaxing position can be held more surely.

In addition, an actuator such as an air cylinder may be used as the restitution executor that includes the drive portion 35, the lock hole 5b and the control circuit 39. In such a case, since the seat 1 is forcibly moved forward by the actuator, it can transition immediately from the relaxing position to the driving position.

In the example shown in FIG. 1 to FIG. 3, the control portion controls the position and the angle of the seat cushion 11. In this case, the position of the seat cushion 11 in the vehicle front-rear direction and in the upper-lower direction is controlled and the inclination angle thereof in the vehicle front-rear direction is controlled between the driving position shown in FIG. 2 and the relaxing position shown in FIG. 3.

In the example shown in FIG. 1 to FIG. 3, included is a case where the control portion controls the position and the angle of only the seat cushion 11. In such a case, the seatback 13 moves collaterally on the inclined guide rails 5 in association with controlling of the position and the angle of the seat cushion 11. Therefore, the control portion controls the positions and the angle only with respect to the seat cushion 11.

The control portion doesn't needs a mechanism for controlling the seatback 13 by controlling only the position and the angle of the seat cushion 11. Therefore, the seat position can be changed by a simpler mechanism while ensuring the downward viewing angle(s) θ1, θ2 of the occupant M.

Figure 4:
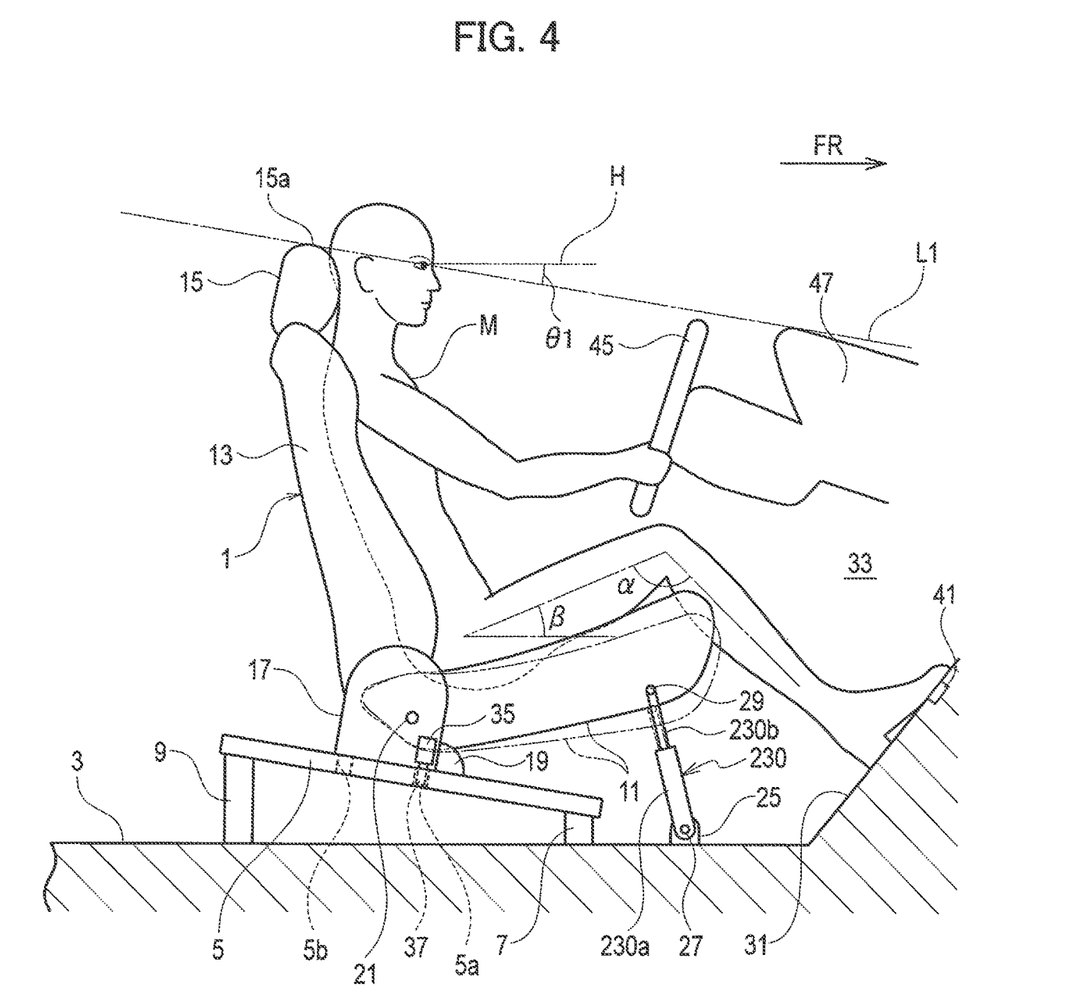
FIG. 4 is a side view showing a second embodiment and is equivalent to FIG. 2.

A second embodiment shown in FIG. 4 uses an air cylinder 230 as a link member instead of the links 23 in comparison with the embodiment shown in FIG. 1 to FIG. 3. FIG. 4 corresponds with the driving position shown in FIG. 2. In the air cylinder 230, a base end of its cylinder main body 230a is rotatably jointed with the lower bracket 25 with the lower pin 27 interposed therebetween, and a top end of its piston rod 230b is rotatably jointed with the seat cushion 11 with the upper pin 29 interposed therebetween.

An overall length of the air cylinder 230 is shortened by retracting the piston rod 230b from a state where it supports the seat cushion 11 as shown by solid lines. According to this, the inclination angle of the seat cushion 11 is made small as shown by two-dot chain lines, and thereby it turns into a state where it is further close to horizontal. In this case, a change amount of the angle of the seat cushion 11 becomes smaller in the relaxing position corresponding with FIG. 3 than that in the example shown in FIG. 1 by the shortened length in the overall length of the air cylinder 230, and thereby rearward and upward displacements of the seat 1 become smaller than those in the example shown in FIG. 1.

Namely, with respect to the link member configured by the air cylinder 230 in the example shown in FIG. 4, each controlled amount of its position and its angle with respect to the seat cushion 11 is variable. According to this, the example shown in FIG. 4 can adapt to an occupant M with large body frame more adequately than the example shown in FIG. 1 to FIG. 3.

If the overall length of the air cylinder 230 is short, the front portion of the seat cushion 11 is made lower in the driving position shown in FIG. 4 to make its inclination gentle and thereby it can adapt to an occupant M with shorter legs. If the overall length of the air cylinder 230 is short, the seat 1 is located vehicularly more forward in the relaxing position corresponding with FIG. 3 and thereby it can adapt to an occupant M with shorter legs.

If the overall length of the air cylinder 230 is long, the front portion of the seat cushion 11 is made higher in the driving position shown in FIG. 4 to make its inclination steep and thereby it can adapt to an occupant M with longer legs. If the overall length of the air cylinder 230 is long, the seat 1 is located vehicularly more rearward in the relaxing position corresponding with FIG. 3 and thereby it can adapt to an occupant M with longer legs.

Note that adjustment of the overall length of the air cylinder 230 in the example shown in FIG. 1 may be done according to taste of the occupant M.

In order to make each controlled amount of the position and the angle with respect to the seat cushion 11 variable, used is the air cylinder 230 whose length between the front portion of the seat cushion 11 and the floor 3, i.e. between the joint portions can be changed variably. Therefore, by merely using the air cylinder 230 instead of the links 23, each controlled amount of the position and the angle of the seat cushion 11 can be easily changed.

Figure 5:
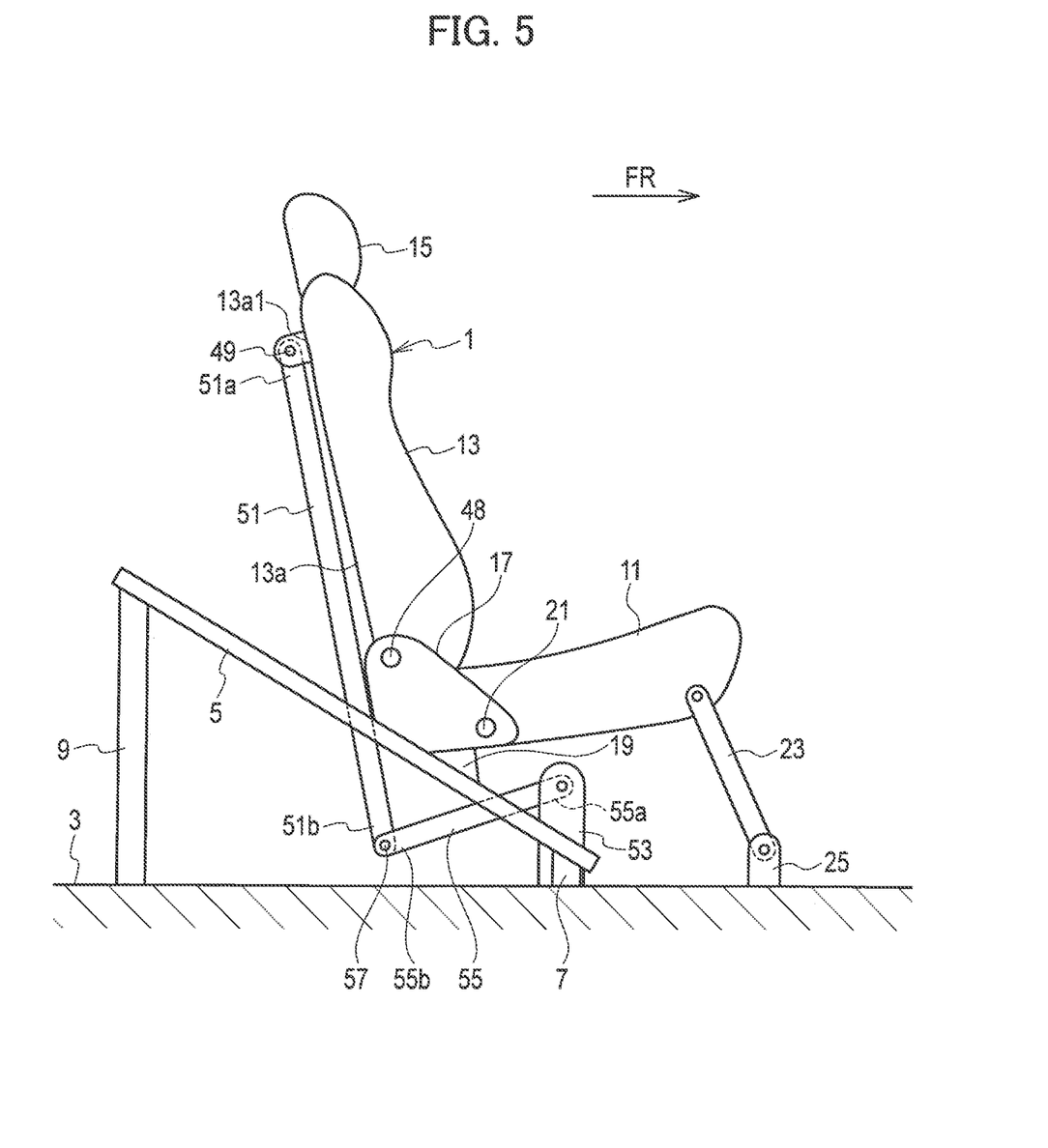
FIG. 5 is a side view showing a third embodiment and is equivalent to FIG. 2.
Figure 6:
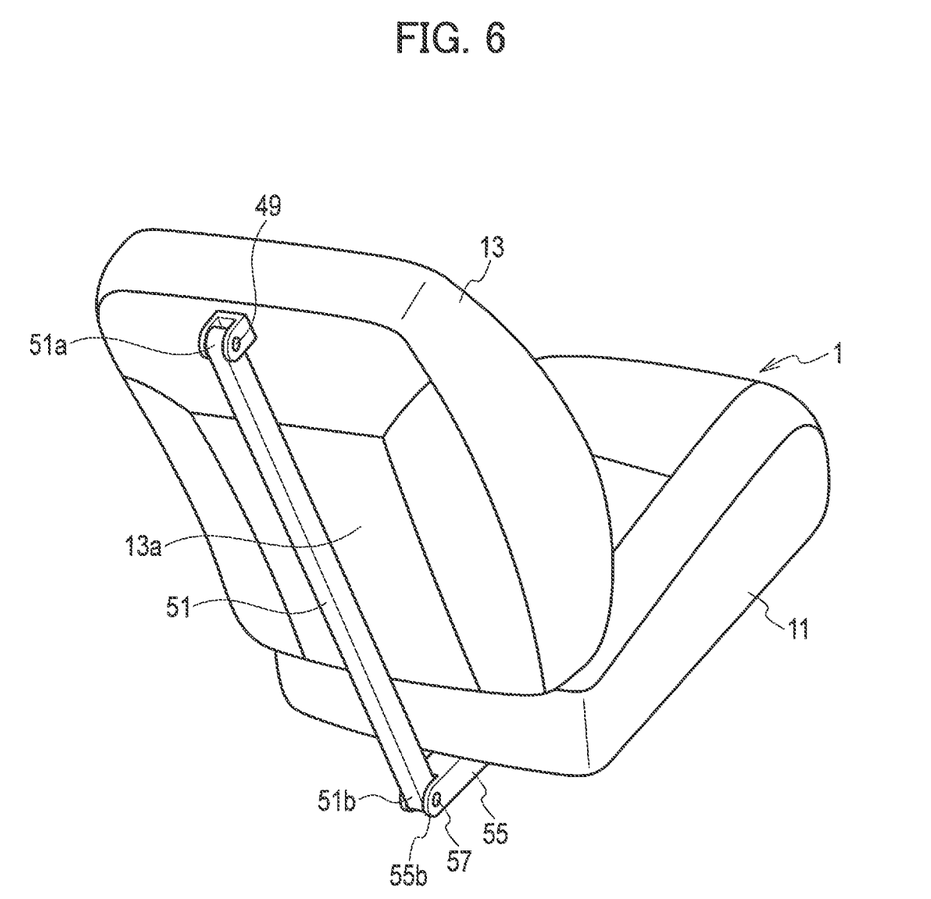
FIG. 6 is a perspective view showing a seat of the third embodiment when it is viewed from its back side.

In a third embodiment shown in FIG. 5, a configuration for controlling an angle of the seatback 13 by the control portion is added to the first embodiment. Therefore, the lower portion of the seatback 13 rotates, with respect to the slide brackets 17, about a support axis 48 extending in the vehicle width direction. The support axis 48 is located vehicularly behind and above the support axis 21 as the rotational center of the seat cushion 11. A configuration of the seat 1 shown in FIG. 5 is the driving position similarly to FIG. 2. Note that the occupant M, the footrests 31, the steering wheel 45 and so on in the first embodiment are omitted in FIG. 5 and it is simplified with respect to FIG. 2.

In the third embodiment, the controls of the position and the angle with respect to the seat cushion 11 and a control of an angle with respect to the seatback 13 are done concurrently. In the controls of the position and the angle with respect to the seat cushion 11, the inclined guide rails 5 and the links 23 are used similarly to the first embodiment. Although there are slight differences, e.g. the inclined angle of the inclined guide rails 5 in the example in FIG. 5 from that in FIG. 2, the mechanism for controlling the position and the angle with respect to the seat cushion 11 is basically equivalent to that in FIG. 2 and configurational elements equivalent to those in FIG. 2 are labelled with identical reference signs.

As shown in FIG. 5, an upper link part 49 is provided at an upper portion 13a1 at almost the center, in the vehicle width direction, of a back face 13a of the seatback 13. An upper end 51a that is one end of a seatback upper link 51 is rotatably jointed with the upper link part 49. The seatback upper link 51 is extended downward from the upper end 51a along the inclination of the seatback 13, and its lower end 51b that is another end thereof is located lower than a lower end of the seatback 13.

A link support bracket 53 is provided on the floor 3 vehicularly behind the links 23 and below the seat cushion 11. The link support bracket 53 is located at almost the center of the seat 1 in the vehicle width direction in association with the seatback upper link 51, and is provided at a position in the vehicle front-rear direction almost in association with the front support members 7 that support the inclined guide rails 5.

A front end 55a that is one end of a seatback lower link 55 is rotatably jointed with an upper portion of the link support bracket 53. A rear end 55b that is another end of a seatback lower link 55 is rotatably jointed with a lower end 51b of the seatback upper link 51 by a link part 57.

In the state shown in FIG. 5 (the driving position), the seatback upper link 51 inclines in the vehicle front-rear direction with respect to the vertical direction so that its lower end 51b is located on a vehicularly forward side from its upper end 51a. In the state shown in FIG. 5, the seatback lower link 55 inclines in the upper-lower direction with respect to the vehicle front-rear direction (the horizontal direction) so that its rear end 55b is located lower and closer to the floor 3 than its front end 55a.

Next, operations of the third embodiment will be described.

Figure 7:
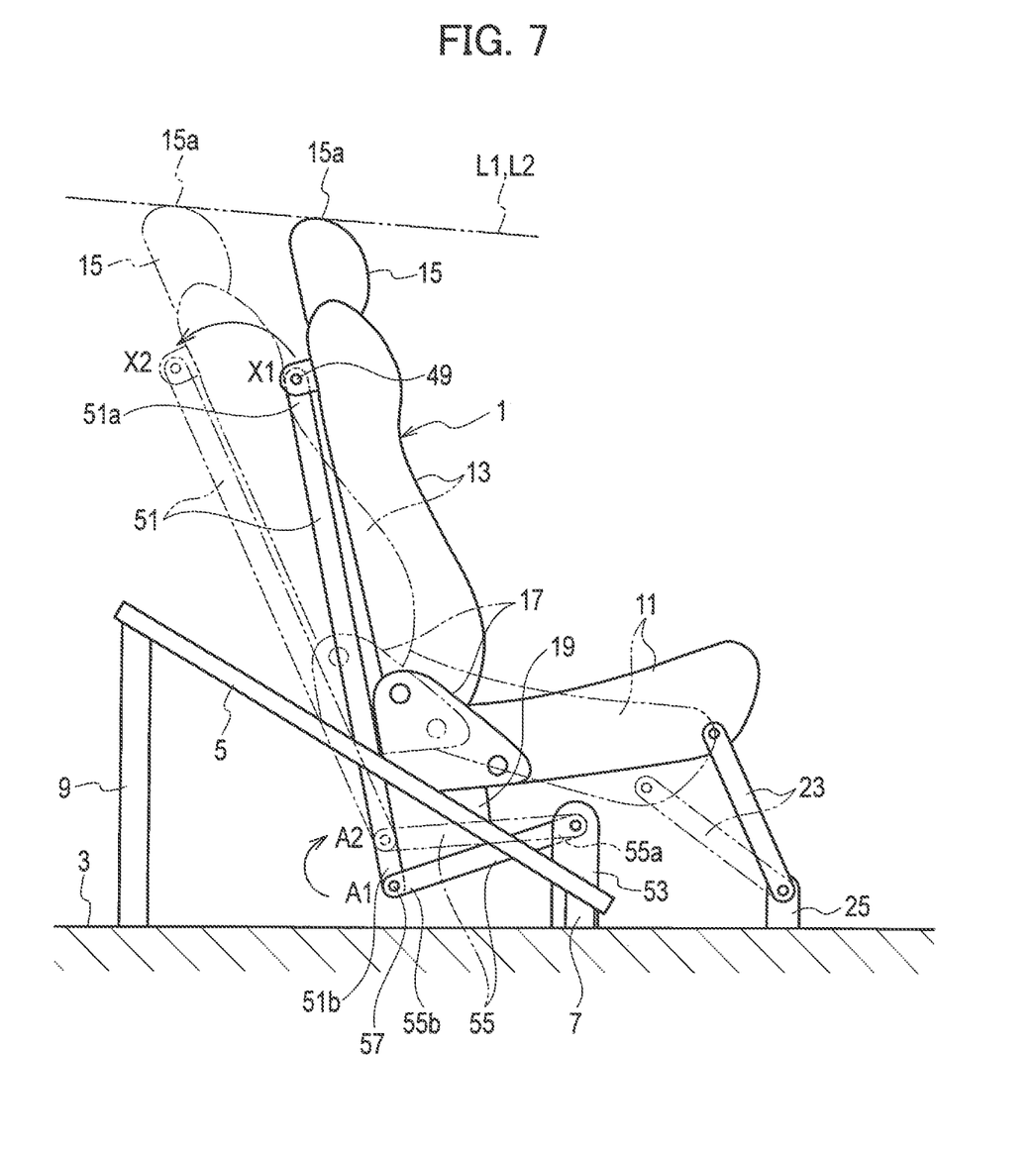
FIG. 7 is a drawing for explaining operations of a seat for a vehicle according to the third embodiment.

In FIG. 7, a state shown by solid lines is the driving position similar to FIG. 2 and FIG. 5, and a state shown by two-dot chain lines is the relaxing position similar to FIG. 3. In the third embodiment, when the occupant M who is sitting on the seat 1 and is not shown in the drawing stretches his/her lower extremity(-ties) in the state where his/her foot (feet) is put on the footrest(s) 31, the seat 1 is controlled so as to move rearward along the inclined guide rails 5 similarly to the first embodiment. Here, the seat cushion 11 rotates with respect to the slide brackets 17 so that its front portion is made lower due to the rotations of the links 23.

Along with the rotational operations of the links 23 similar to those in the first embodiment, the seatback upper link 51 and the seatback lower link 55 are displaced as described below.

The seatback lower link 55 rotates clockwise in FIG. 7 about its front end 55a as a pivot point jointed with the upper portion of the link support bracket 53 so that its rear end 55b moves upward and slightly vehicularly rearward. According to this, the seatback lower link 55 turns into a state where it is further close to horizontal from an inclined state where its rear end 55b is located lower than its front end 55a.

On the other hand, in the seatback upper link 51, its lower end 51b jointed with the rear end 55b of the seatback lower link 55 moves upward and slightly vehicularly rearward, and its upper end 51a moves vehicularly rearward and slightly upward. According to this, the upper end 51a moves vehicularly rearward and slightly upward and the lower end 51b moves vehicularly upward, so that the inclination of the seatback upper link 51 becomes gentler than that in the driving position shown by the solid lines.

Namely, a link joint point corresponding to the link part 57 that corresponds to a joint portion of the seatback upper link 51 and the seatback lower link 55 is displaced from A1 to A2. In addition, an upper joint point corresponding to the upper link part 49 that corresponds to a joint portion of the upper end 51a of the seatback upper link 51 and the seatback 13 is displaced from X1 to X2.

Along with the above-mentioned displacements of the seatback upper link 51 and the seatback lower link 55, the inclination of the seatback 13 becomes gentle in association with the inclination of the seatback upper link 51, and thereby it turns into a state where it inclines rearward further. Namely, while the seat cushion 11 is controlled to be moved rearward and upward while being guided by the inclined guide rails 5, the seatback upper link 51 and the seatback lower link 55 control the seatback 13 to incline it rearward.

In this case, the position and the angle of the seat cushion 11 are controlled and the angle of the seatback 13 is controlled so that the upper end 15a of the seat 1 is located on the inclined straight line L2, L2 extending downward on a forward side of the upper end 15a.

Also in the third embodiment, when the lower extremity(-ties) is stretched in a state where the vehicle is in autonomous driving and the seat 1 is in the driving position shown by the solid lines in FIG. 7, the seat 1 is controlled to move rearward and upward and then turns into the relaxing position shown by the two-dot chain lines in FIG. 7. Here, the downward viewing angle(s) θ1, θ2 of the occupant M can be restricted from changing, and thereby a view field required for driving operations and forward drive-monitoring can be ensured sufficiently.

Since the seatback 13 is inclined rearward further in the relaxing position at that time in the third embodiment, the occupant M can get a more relaxing state. As the result, for the occupant M, fatigue symptoms, such as a feeling of being hard to move his/her joints when getting off a vehicle after a long-time vehicle riding, can be decreased.

In the third embodiment, the position and the angle of the seat cushion 11 and the angle of the seatback 13 are controlled concurrently. Therefore, posture of the occupant M can be transitioned quickly to a relaxing state.

The vertical position of the upper end 15a of the seat 1 in the relaxing position with respect to the driving position can be adjusted by changing the length of the seatback upper link 51.

Figure 8:
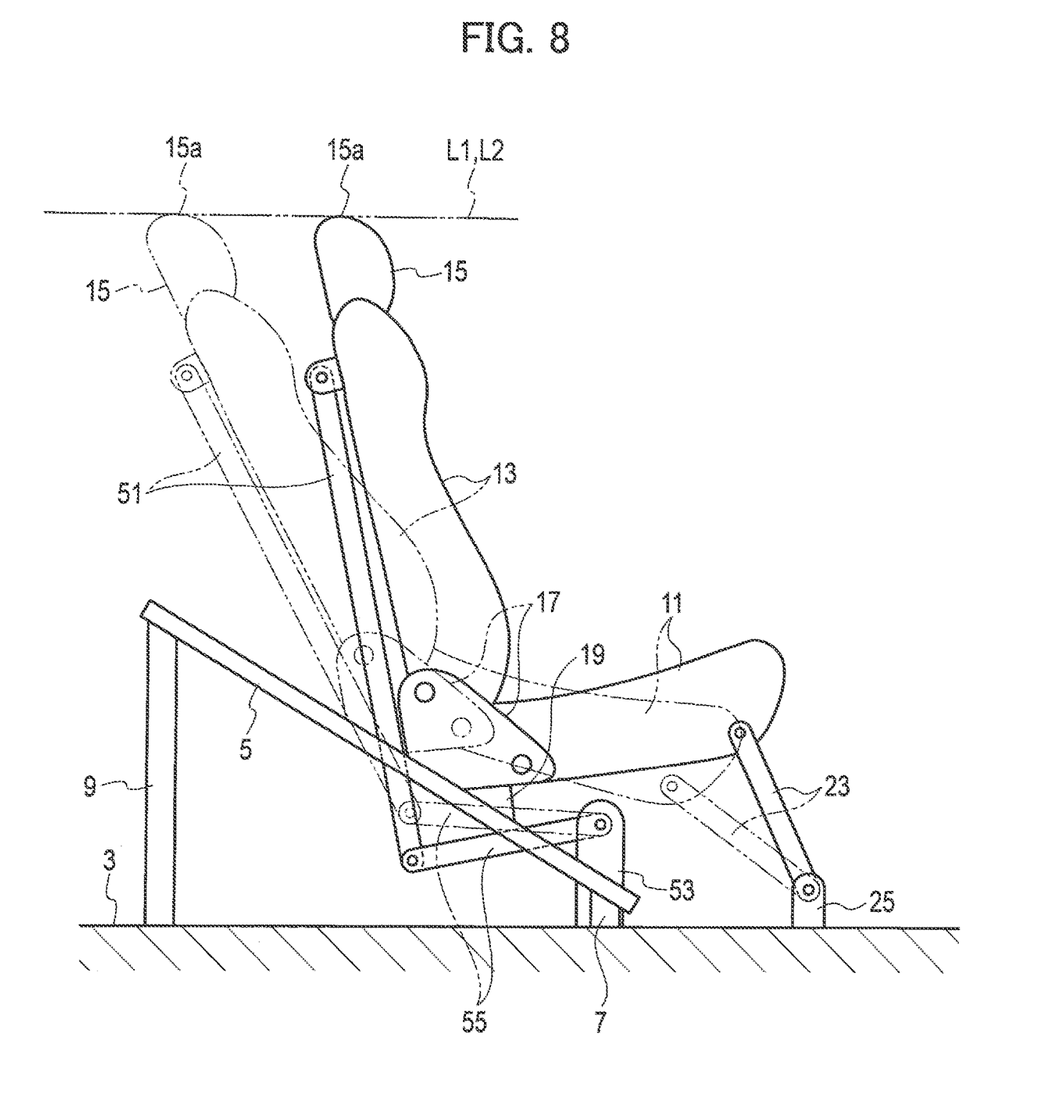
FIG. 8 is a drawing for explaining operations, in the third embodiment, in a case where a length of a seatback upper link is made shorter than that in the case shown in FIG. 7.

For example, when making the length of the seatback upper link 51 short as shown in FIG. 8 in comparison with that in FIG. 7, the upper end 15a in the relaxing position is located at a lower position. Conversely, when making the length of the seatback upper link 51 long as shown in FIG. 7 in comparison with that in FIG. 8, the upper end 15a in the relaxing position is located at a higher position. Namely, by making the length of the seatback upper link 51 long, a difference of the vertical position of the upper end 15a between the driving position and the relaxing position becomes large.

The inclination angle of the seatback 13 in the relaxing position with respect to the driving position can be adjusted by changing the length of the seatback lower link 55.

Figure 9:
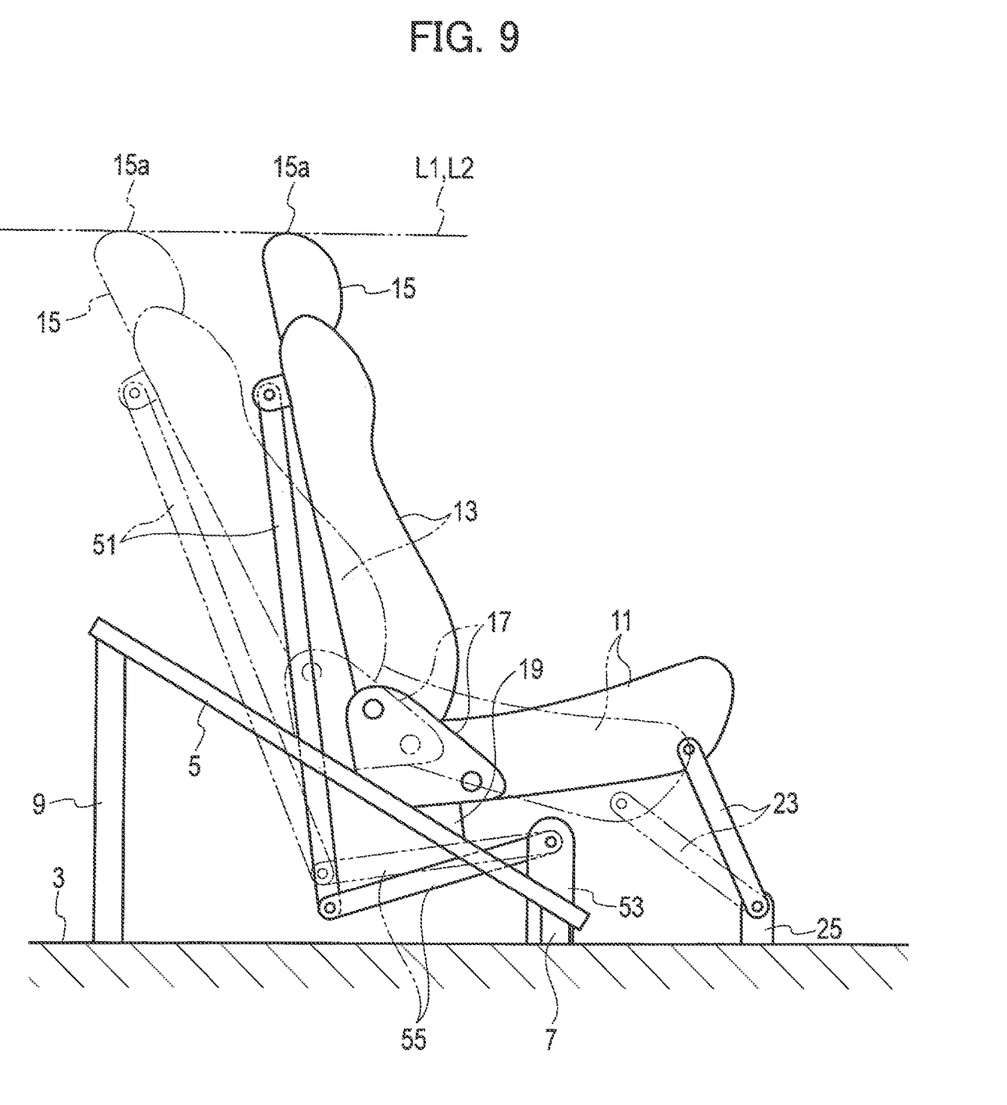
FIG. 9 is a drawing for explaining operations, in the third embodiment, in a case where a length of a seatback lower link is made longer than that in the case shown in FIG. 7.

For example, when making the length of the seatback lower link 55 long as shown in FIG. 9 in comparison with that in FIG. 7, the inclination angle of the seatback 13 in the relaxing position turns into a state it is further inclined backward. Conversely, when making the length of the seatback lower link 55 short as shown in FIG. 9 in comparison with that in FIG. 7, the inclination angle of the seatback 13 in the relaxing position turns into a state where it is inclined closer to vertical. Namely, by making the length of the seatback lower link 55 long, a difference of the inclination angle of the seatback 13 between the driving position and the relaxing position becomes large.

By changing the both lengths of the seatback upper link 51 and the seatback lower link 55, both of the vertical position of the upper end 51a of the seat 1 and the inclination angle of the seatback 13 can be adjusted between the driving position and the relaxing position.

Depending on a combination of the lengths of the seatback upper link 51 and the seatback lower link 55, there may be a case where both of the vertical position of the upper end 15a of the seat 1 and the inclination angle of the seatback 13 can be adjusted between the driving position and the relaxing position only by changing any one of the lengths.

As explained above, the backward inclined angle of the seatback 13 and the vertical position of the upper end 51a of the seat 1 can be adjusted by changing at least any one of the lengths of the seatback upper link 51 and the seatback lower link 55.

The fact that the vertical position of the upper end 51a of the seat in the relaxing position is variable corresponds to a fact that the inclination angle (the downward viewing angle $\theta 1 = \theta 2$) of the inclined straight line L1, L2 extending downward on a forward side of the upper end 15a of the seat 1 is variable. Therefore, the inclination angle (the downward viewing angle $\theta 1 = \theta 2$) of the inclined straight line L1, L2 and the rearward inclined angle of the seatback 13 can be adjusted according to a shape of the vehicle body, body frame and taste of the occupant M and so on, and thereby a highly versatile seat for a vehicle can be obtained.

Figure 10:
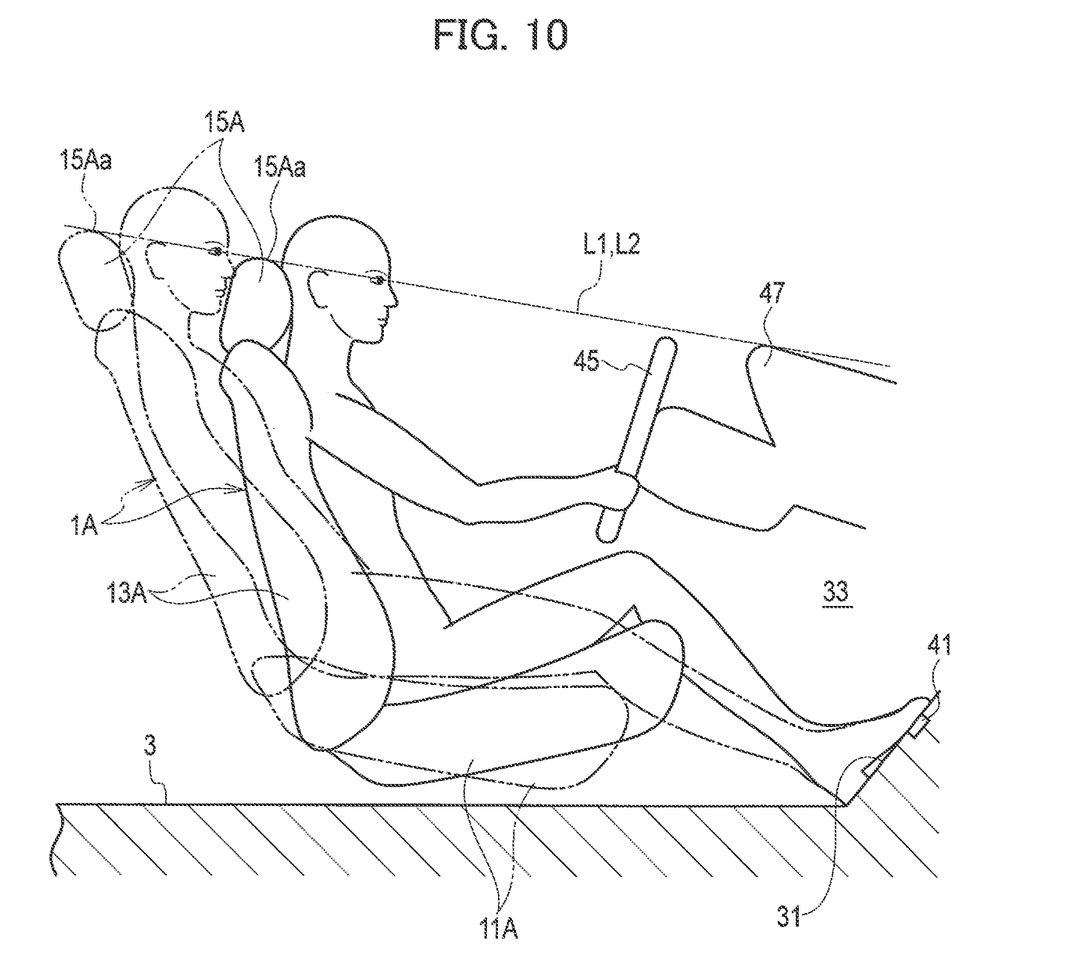
FIG. 10 is a drawing for explaining operations showing an example for controlling a position and an angle of a headrest in addition to a configuration for controlling positions and angles of a seat cushion and a seatback.

A fourth embodiment shown in in FIG. 10 shows an example, while simplifying it, in which an angle of the headrest 15A is controlled in addition to controlling the position and the angle of the seat cushion 11A and controlling the angle of the seatback 13A. The angle of the headrest 15A can be adjusted in the front-rear direction by making its lower portion rotatable about an axial center along the vehicle width direction with respect to the seatback 13A.

For example, a forward urging force is applied to the headrest 15A by an elastic member such as a spring(s).

When the occupant M presses his/her head onto the headrest 15A in this state, the headrest 15A rotates from the state shown by solid lines to a state shown by two-dot chain lines and thereby its angle changes rearward. Therefore, posture of the occupant M can be transitioned to a more relax state. Also in this example, the upper end 15Aa of the headrest 15A of the seat 1A is located on the inclined straight line L1, L2. Therefore, the downward viewing angle $\theta 1$, $\theta 2$ can be kept almost constant, and thereby a view field required for driving operations and forward drive-monitoring can be ensured sufficiently.

Note that the inclined guide rails 5 is different from conventional seat slide rails for sliding a seat for a vehicle forward or rearward according to drive portion's body frame or taste. Therefore, the inclined guide rails 5 may be slidably attached onto such seat slide guide rails with the front support members 7 and the rear support members 9 interposed therebetween. In the third embodiment shown in FIG. 5, the link support bracket 53 may be attached to the seat slide guide rails so as to be capable of sliding integrally with the front support members 7 and the rear support members 9.

The embodiments of the present invention are described above, but these embodiments are mere examples described to make the present invention easily understood, and the present invention is not limited to the above embodiments. The technical scope of the present invention is not limited to specific technical matters disclosed in the above embodiments, and includes modifications, changes, alternative techniques easily derived from them.

For example, the vehicle is explained as an autonomous driving vehicle in the above embodiments, but the present invention can be applied to a vehicle that is not an autonomous driving vehicle. In addition, the present invention is applied to a drive portion's seat in the above embodiments, but the present invention can be applied to a passenger's seat.

In the above embodiments, a muscular power of the occupant M is utilized when controlling the position and the angle of the seatback and the seat cushion from the driving position to the relaxing position. However, a drive mechanism such as a motor may be utilized in order to assist a muscular power of the occupant M. Namely, the "control portion" may include, but not shown in the drawings, a drive mechanism such as an assist motor for assisting a muscular power of the occupant M.

The position and the angle of the seat cushion 11 are controlled in the first embodiment shown in FIG. 1 to FIG. 3, but at least one of the position and the angle of the seat cushion 11 may be controlled. The angle of the seatback 13 is controlled in the third embodiment shown in FIG. 5, but the position of the seatback 13 may be controlled. The angle of the headrest 15A is controlled in the fifth embodiment shown in FIG. 10, but the position of the headrest 15A may be controlled.

The present invention is applied to a seat for a vehicle whose position and angle can be changed in a passenger compartment.

REFERENCE SIGNS LIST

M occupant
L1, L2 inclined straight line
1 seat
3 floor of a vehicle body
5 inclined guide rail(s) (inclined guide portion, control portion)

5a lock hole (control restriction mechanism)
5b lock hole (restitution executor)
11 seat cushion
13 seatback
13a1 upper portion of a back face of the seatback
15, 15A headrest
15a, 15Aa upper end of the headrest (upper end of the seat)
23 links (ling member, control portion)
31 footrest (foot resting portion)
35 drive portion (control restriction mechanism, restitution executor)
39 control circuit (control restriction mechanism unlock portion, restitution executor)
41 foot power sensor (foot power detector)
51 seatback upper link
51a upper end (one end) of the seatback upper link
51b lower end (another end) of the seatback upper link
55 seatback lower link
55a front end (one end) of the seatback lower link
55b rear end (another end) of the seatback lower link
230 air cylinder (link member, control portion)

The invention claimed is:

1. A vehicle, comprising:
a seat assembly that is mounted on the vehicle and includes a seatback and a seat cushion;
a footrest that is provided in front of the seat assembly and on which an occupant can put a foot; and
a drive mechanism configured to control at least a position of the seatback and the seat cushion, in response to the foot of the occupant being put on the footrest, to position an upper end of the seat assembly upward on a rearward side of the upper end, wherein a line of sight of the occupant remains substantially similar before and after the drive mechanism controls the position of the seatback and the seat cushion.

2. The vehicle according to claim 1, wherein the seat assembly further comprises:
a headrest at an upper portion of the seatback, wherein the drive mechanism is further configured to control at least one of a position or an angle of the headrest.

3. The vehicle according to claim 1, further comprising:
a control restriction mechanism that restricts a control for the seat assembly in a state before the occupant stretches the lower extremity;
a foot power detector that is provided in the footrest and detects a foot power of the occupant; and
a control restriction mechanism unlock portion that unlocks the control restriction mechanism when the foot power detector detects a foot power with a value equal-to or larger-than a prescribed value that is associated with an action of stretching the lower extremity by the occupant during autonomous driving of the vehicle, the vehicle being an autonomous driving vehicle in which acceleration/deceleration and steering are carried out autonomously.

4. The vehicle according to claim 3, further comprising:
a restitution executor that restitutes the seat assembly from a position after the occupant stretches the lower extremity to a position before the occupant stretches the lower extremity when an autonomous driving state is cancelled during the autonomous driving of the vehicle or when the foot power detector detects a foot power with a value smaller than the prescribed value.

5. The vehicle according to claim 1, wherein
the drive mechanism concurrently controls the position and an angle of the seatback and the position and an angle of the seat cushion.

6. The vehicle according to claim 1, wherein
the drive mechanism controls the position and an angle of only the seat cushion.

7. The vehicle according to claim 1, wherein
the drive mechanism further includes an inclined guide member that inclines to position a vehicularly rear side thereof higher than a vehicularly front side thereof, and
the seat assembly is controlled while being guided by the inclined guide member.

8. The vehicle according to claim 7, wherein
the seat cushion is provided rotatably in an upper-lower direction about a rear portion of the seat cushion as a pivot point with respect to the inclined guide member,
a front portion of the seat cushion and a floor of a vehicle body is linked with each other by a link member, and
the link member rotatably supports the seat cushion about a floor-side end of the link member as a pivot point to make a front portion of the seat cushion lowered while the seat cushion is controlled rearward by being guided by the inclined guide member.

9. The vehicle according to claim 8, wherein
a controlled amount of the position and an angle of the seat cushion is variable when the link member rotatably supports the seat cushion about the floor-side end of the link member as the pivot point.

10. The vehicle according to claim 9, wherein
a length of the link member between an opposite end, to the floor-side end, thereof coupled with the front portion of the seat cushion and the floor-side end thereof coupled with the floor of the vehicle body is variable.

11. The vehicle according to claim 8, further comprising:
a seatback upper link whose one end is jointed with an upper portion of the seatback and that is extended downward from the one end; and
a seatback lower link whose one end is rotatably jointed with the floor of the vehicle body and whose another end is positioned on a vehicularly rear side and jointed rotatably with the other end of the seatback upper link,
wherein the seatback upper link and the seatback lower link incline the seatback rearward while the seat cushion is controlled rearward by being guided by the inclined guide member.

12. The vehicle according to claim 11, wherein
at least any one of a rearward inclined angle of the seatback and an inclination angle of an inclined straight line extending downward on a forward side of the upper end of the seat assembly changes by changing at least any one length of the seatback upper link and the seatback lower link.

13. The vehicle according to claim 1, wherein
the drive mechanism is configured to control at least the position of the seatback and the seat cushion to position the upper end of the seat assembly downward on a forward side of the upper end in a state where the occupant does not put the foot on the footrest.

14. The vehicle according to claim 1, wherein the rearward side of the upper end is further away from the footrest than a frontward side of the upper end.

15. A vehicle, comprising:
a seat assembly that is mounted on the vehicle and includes a seatback and a seat cushion;
a footrest that is provided in front of the seat assembly and on which an occupant can put a foot; and
a drive mechanism configured to control at least a position of the seatback and the seat cushion, in response to the foot of the occupant being put on the footrest, to position an upper end of the seat assembly upward in a rearward direction, wherein a line of sight of the occupant remains substantially similar before and after the drive mechanism controls the position of the seatback and the seat cushion.

16. A vehicle, comprising:
a seat assembly that is mounted on the vehicle and includes a seatback and a seat cushion;
a footrest that is provided in front of the seat assembly and on which an occupant can put a foot; and
a drive mechanism configured to control at least a position of the seatback and the seat cushion, in response to the foot of the occupant being put on the footrest, to move an upper end of the seat assembly in upward and rearward directions simultaneously, wherein a line of sight of the occupant remains substantially similar before and after the drive mechanism controls the position of the seatback and the seat cushion.

\* \* \* \* \*